Nov. 22, 1966  E. L. PARR  3,286,996

CONCRETE MIXER

Filed Oct. 18, 1965

INVENTOR.
EDWARD L. PARR
BY
FULWIDER, PATTON, RIEBER, LEE & UTECHT
ATTORNEYS

United States Patent Office 3,286,996
Patented Nov. 22, 1966

3,286,996
CONCRETE MIXER
Edward L. Parr, El Cajon, Calif., assignor to
Wendell L. Thompson, Burbank, Calif.
Filed Oct. 18, 1965, Ser. No. 497,066
11 Claims. (Cl. 259—177)

The present invention relates to a mixer for concrete or the like, which mixer is removably attached to the hub of a wheel of a vehicle, such as an automobile or a power driven truck.

As is well known, the wheels of such vehicles are each provided with a central section having holes which are adapted to receive the threaded studs on the hub which is driven through the differential of the vehicle. The hopper of the present invention is open at the front for receiving the material to be mixed and for emitting the material after it is mixed. An attachment for the rear end of the hopper is provided with holes which are aligned with holes which are aligned with the threaded studs in the hub for receiving the studs, whereby the hopper is held in position when the nuts are fixed to the studs.

More specifically, the rear end of the hopper is provided with a rear wall having an opening. An attachment in the form of a removable bracket is utilized for attaching the hopper to the wheel. This bracket is provided with a section having holes which are aligned with the hub for receiving the studs; it also includes a second section formed integrally with the first mentioned section and this second mentioned section extends through the opening in the rear wall of the hopper; a third section is formed integrally with the second mentioned section and this third section is disposed to abut the interior side of the rear wall of the hopper. The length of the second mentioned section is such that when the first mentioned section is fixed to the hub by the studs and nuts, the rear end of the hopper is drawn into engagement with the wheel.

Still more specifically, the aforementioned bracket is in the form of a cup, the base thereof being provided with the holes which are aligned with the threaded studs in the hub for receiving the studs. The forward end of the side wall of the cup extends through the opening in the rear wall of the hopper and the rim of the cup is in the form of a flange which is adapted to abut the interior side of the rear wall of the hopper about the opening in the rear wall. The length of the side wall of the cup is such that when the base is fixed to the hub by the studs and nuts, the rear end of the hopper is drawn into engagement with the wheel.

In the preferred embodiment of the invention, the hopper is frustum in shape and includes a plurality of side walls the edges thereof being joined with one another at abrupt angles. More specifically, the hopper is in the form of a frustum of a square pyramid.

Other features and the advantages of the present invention will be apparent from the following description, reference being had to the accompanying drawing, wherein a preferred embodiment of the invention is illustrated.

Figure 1:
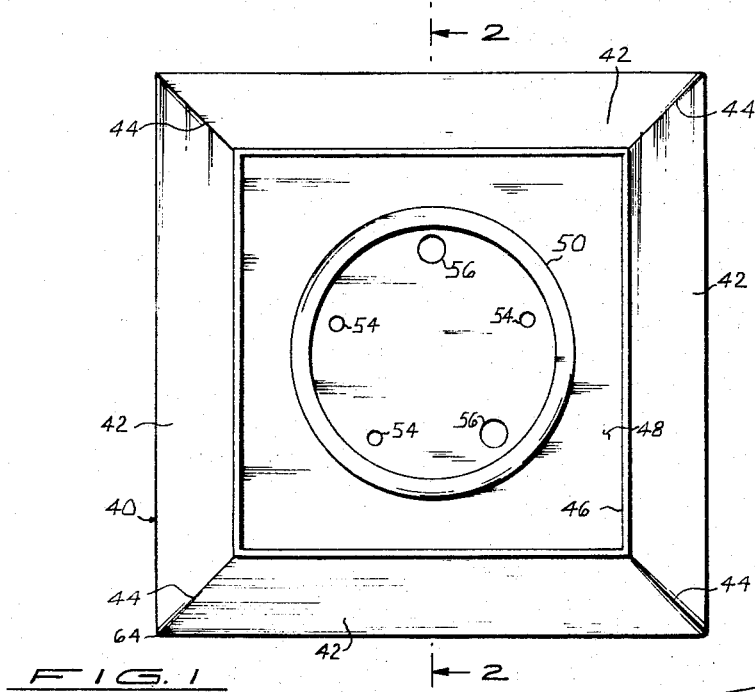
FIG. 1 is a front view of the hopper.
Figure 2:
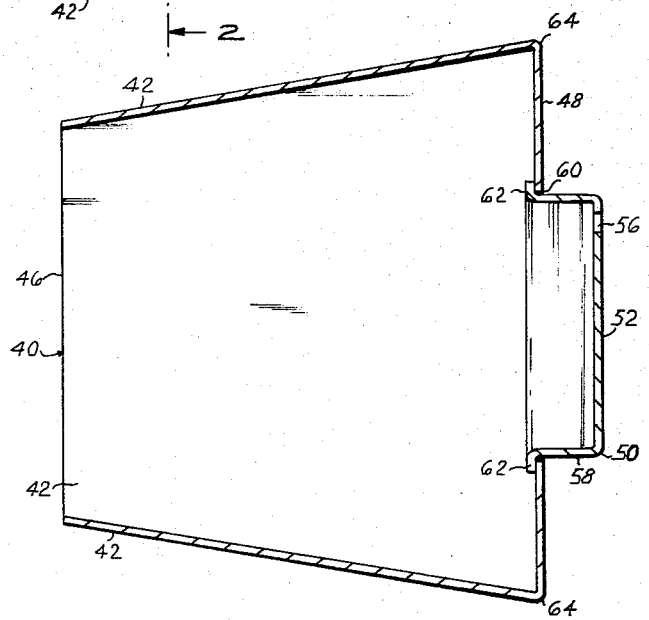
FIG. 2 is a longitudinal, sectional view of the hopper taken along line 2—2 of FIG. 1.
Figure 3:
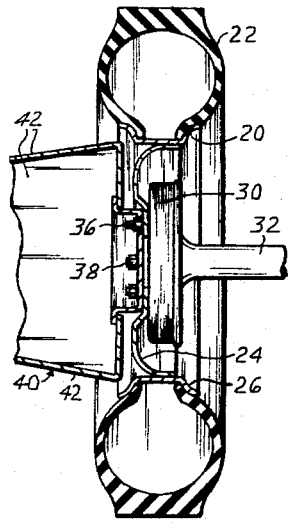
FIG. 3 is a vertical, sectional view of a wheel and tire, hopper and the bracket for attaching the hopper to the wheel, together with a view in elevation of the hub and the drive shaft for the hub.

Referring more in detail to the drawing, the wheel of the vehicle is shown at 20 and is surrounded by a tire 22. The wheel 20 includes a central section 24 which is surrounded by a circular rim 26 which is welded to the periphery of the central portion 24. A hub 30, which is driven by an axle or shaft 32, is provided with a series of threaded studs 36; usually five such studs are provided. These studs receive nuts 38 which are normally employed to hold the wheel in proper position on the hub. Five holes (not shown) are formed in the central section 24 of the wheel and are aligned with the five studs in the hub.

The hopper 40 is in the form of a frustum with the edges of the side walls suitably joined at an abrupt angle. In the embodiment illustrated, the hopper is in the form of the frustum of a square pyramid including four side walls 42 of identical shape, the edges of which are joined with one another, preferably by welding, the joined edges being indicated by numeral 44. The front end 46 of the hopper is open for receiving the material to be mixed and for emitting the material after it is mixed. The side walls 42 are joined with a rear wall 48.

A bracket 50 is utilized for clamping the rear wall 48 of the hopper to the wheel and hub. This bracket includes a base section 52 which is provided with five holes, three of which are indicated at 54 and two of these holes are indicated at 56. These five holes are equally spaced and are aligned with the five studs on the hub. The base is held to the hub and against the outer surface of the central section 24 of the wheel 20 by the studs 36 which extend through the three smaller holes 54 when the nuts 38 are tightened thereon. The wheel at this time is held in place on the hub by all five studs and nuts since the holes 56 have a diameter greater than the maximum diameter of the nuts 38. Thus, the hopper is held in position on the wheel merely by the studs which pass through the holes 54 in the base 52 when the nuts are tightened. The bracket 50 includes a section 58 which extends through an opening 60 in the rear wall 48 of the hopper. The bracket also includes a section 62 which is adapted to abut the inside of the rear wall 48. The length of the section 58 is such that when the base section 52 is fastened to the wheel, the outer four corners 64 of the wheel are clamped against the rim 26 of the wheel. The bracket 50, in the preferred embodiment, is in the form of a cup, the base of which is indicated at 52, the sides at 58 and the section 62 is in the form of a flange, which flange bears against the inside of rear wall 48 of the hopper.

Since there is a variance in wheel design by various manufacturers, various length brackets will be employed, that is, various cups having different length sides 58 will be made to complement the desired shapes of various designs of wheels, whereby, in any event, when the proper length cup is employed, the hopper will be clamped securely against the rim of the wheel.

It is to be understood that in operating this device, the side of the vehicle bearing the hopper will be elevated so that the tire clears the ground. In operating the device, the wheel, carrying the hopper, is rotated at the desired speed and while rotating, the material to be mixed is received by the upper end 46 of the hopper. The mix being rotated will be centrifugally held against the interior of the side walls 42 of the hopper.

Preferably the hopper is non-circular in shape and as illustrated, is in the form of a frustum of a square pyramid, whereby severe tumbling action is provided for the mix as the hopper is being rotated.

By virtue of the present invention, it will be apparent that through the adaptor type bracket 50, there has been provided a mixer which is relatively simple in construction, inexpensive to manufacture, and highly efficient.

It is necessary only to remove, for example, several of the nuts which hold the wheel in place, apply the hopper and the bracket to the wheel and then replace the nuts which had previously been removed. In the present illustration, three of the nuts are removed, while the two nuts which extend through the openings 56 maintain the wheel in position while the bracket and hopper are being attached.

While the form of embodiment herein shown and described constitutes preferred form, it is to be understood that other forms may be adopted falling within the scope of the claims that follow.

I claim:
1. A mixer for concrete or the like for use with an engine driven vehicle having an engine driven hub, which hub is provided with threaded studs for receiving wheel retaining nuts, which vehicle includes a wheel including a rim and a central section connected with the rim and is provided with holes alignable with the threadable studs in the hub, the mixer comprising in combination:
   (A) a hopper having an opening at the front end thereof, said hopper being frustum in shape and includes a plurality of side walls, the edges thereof being joined with one another at an abrupt angle;
   (B) and means at the rear end of the hopper, said means having holes therein aligned with the threaded studs in the hub for receiving said studs, whereby the hopper is held in position when the nuts are fixed to the studs.

2. A mixer for concrete or the like for use with an engine driven vehicle having an engine driven hub, which hub is provided with threaded studs for receiving wheel retaining nuts, which vehicle includes a wheel including a rim and a central section connected with the rim and is provided with holes alignable with the threadable studs in the hub, the mixer comprising in combination:
   (A) a hopper having an opening in the front end thereof and a rear wall having an opening;
   (B) a removable bracket having:
      (a) a section provided with holes which are aligned with the threaded studs in the hub for receiving said studs;
      (b) a second section formed integrally with the first mentioned section and extending through the opening in the rear wall of the hopper;
      (c) a third section formed integrally with the second mentioned section and disposed to abut the interior side of the rear wall of the hopper; the length of the second mentioned section being such that when the first mentioned section is fixed to the hub by the studs and nuts, the rear end of the hopper is drawn into engagement with the wheel.

3. A mixer as defined in claim 1, characterized in that the frustum is of a square pyramid.

4. A mixer for concrete or the like for use with an engine driven vehicle having an engine driven hub, which hub is provided with threaded studs for receiving wheel retaining nuts, which vehicle includes a wheel including a rim and a central section connected with the rim and is provided with holes alignable with the threadable studs in the hub, the mixer comprising in combination:
   (A) a hopper having an opening in the front end thereof and a rear wall having an opening;
   (B) a cup having:
      (a) a base provided with holes which are aligned with threaded studs in the hub for receiving said studs;
      (b) a side wall extending through the opening in the rear wall of the hopper;
      (c) an outwardly extending flange at the rim of the cup disposed to abut the interior side of the rear wall of the hopper about the opening in said rear wall;
         said length of the side wall of the cup being such that when the base is fixed to the hub by the studs and nuts, the rear end of the hopper is drawn into engagement with the wheel.

5. A mixer as defined in claim 2, characterized in that the rear end of the hopper is drawn in engagement with the rim of the wheel.

6. A mixer as defined in claim 5, characterized in that the hopper is frustum in shape and includes a plurality of side walls, the edges thereof being joined with one another at abrupt angles.

7. A mixer as defined in claim 5, characterized in that the hopper is in the form of a frustum of a square pyramid.

8. A mixer as defined in claim 2, characterized in that the hopper is frustum in shape and includes a plurality of side walls, the edges thereof being joined with one another at abrupt angles.

9. A mixer as defined in claim 2, characterized in that the hopper is in the form of a frustum of a square pyramid.

10. A mixer as defined in claim 4, characterized in that the hopper is frustum in shape and includes a plurality of side walls, the edges thereof being joined with one another at abrupt angles.

11. A mixer as defined in claim 4, characterized in that the hopper is in the form of a frustum of a square pyramid.

References Cited by the Examiner

UNITED STATES PATENTS

| | | | |
|---|---|---|---|
| 2,377,881 | 6/1945 | Hans | 180—53 |
| 2,642,235 | 6/1953 | Smith | 180—53 |

FOREIGN PATENTS

| | | |
|---|---|---|
| 878,541 | 10/1961 | Great Britain. |

WALTER A. SCHEEL, *Primary Examiner.*

R. W. JENKINS, *Assistant Examiner.*